UNITED STATES PATENT OFFICE.

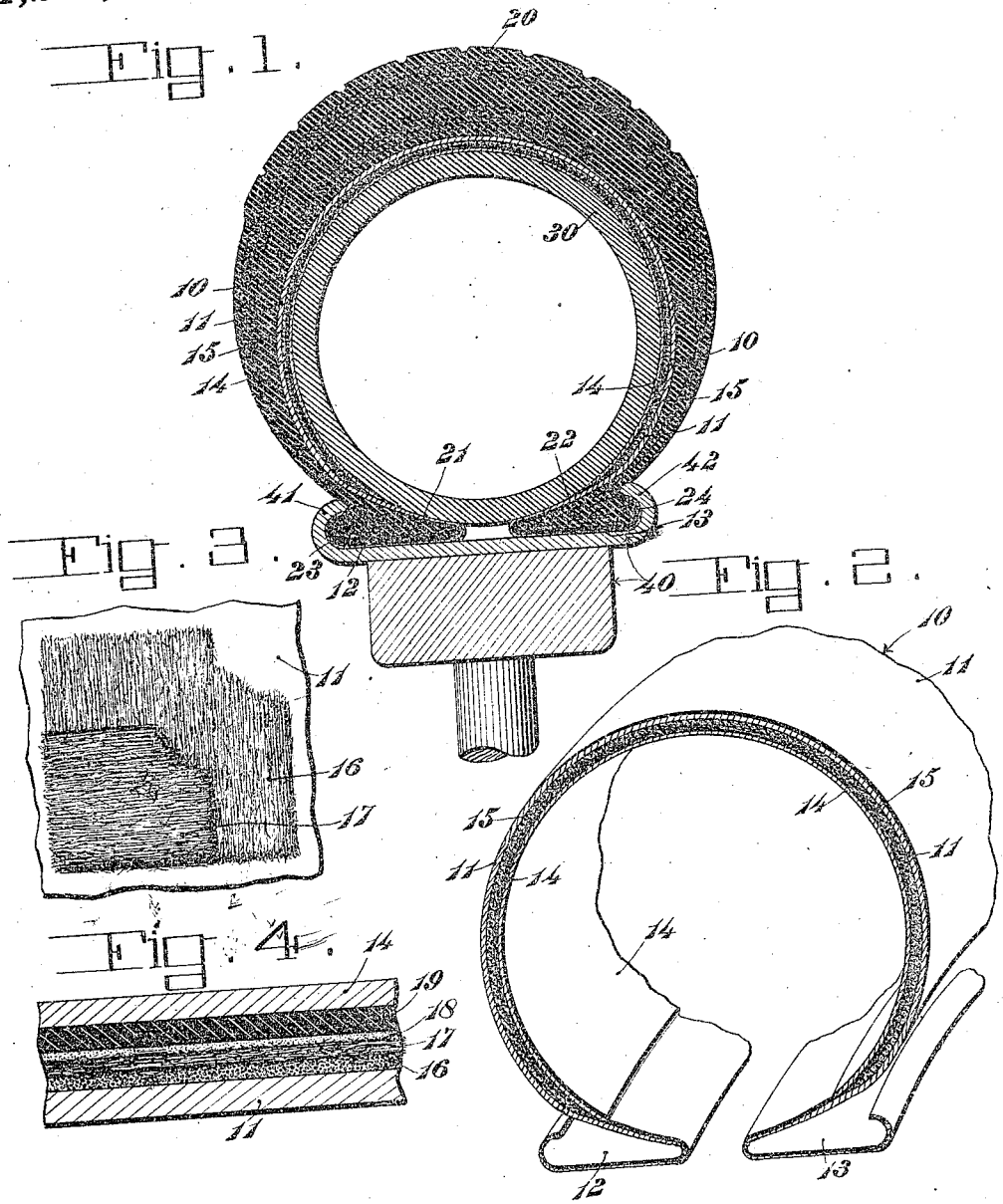

CHARLES SIMEON GOODFELLOW, OF JERSEY CITY, NEW JERSEY.

NON-PUNCTURABLE INNER LINING FOR AUTOMOBILE-TIRES.

1,260,186.

Specification of Letters Patent.

Patented Mar. 19, 1918.

Application filed October 7, 1914. Serial No. 865,509.

*To all whom it may concern:*

Be it known that I, CHARLES SIMEON GOODFELLOW, a citizen of the United States of America, and a resident of Jersey City, in the county of Hudson and State of New Jersey, have invented certain new and useful Improvements in Non-Puncturable Inner Linings for Automobile-Tires, whereof the following is a specification.

The object of this invention is to provide an inner lining impenetrable to the ordinary puncturing devices encountered on the road and yet sufficiently flexible to yield to the inequalities of the roadbed.

Figure 1 of the accompanying drawings represents a transverse section of a wheel rim, a pneumatic tire mounted thereon, and an inner lining embodying this improvement disposed in said tire between the inner tube and the outer casing thereof.

Fig. 2 represents a perspective view of a fragment of this inner lining detached.

Fig. 3 represents a plan view of some of the parts of this inner lining as said parts appear at one stage of the process of making said lining.

Fig. 4 represents a section including all the parts and ingredients entering into the lining assembled for vulcanization.

Fig. 5 represents a section of the composite fabric of this inner lining after vulcanization.

The same reference numbers indicate corresponding parts in the different figures.

An inner lining 10 of the drawings represents an embodiment of this invention. This inner lining is structurally independent of the other parts of the pneumatic tire and is applicable to various forms thereof, including those already in use as well as to new tires. The lining 10 is shown in Fig. 1 disposed within a pneumatic tire between an outer clencher casing 20 and an inner tube 30, said tire being mounted on a wheel rim 40.

This lining comprises two layers 11 and 14 composed of rawhide or equivalent material and an intermediate composite layer 15 composed of asbestos, aluminum and rubber, the whole being vulcanized together under heat and pressure.

In making the inner lining 10 a sheet of rawhide 11 is cut to a proper length and to a proper width for the size of the tire to be protected. The protective body of the sheet 11 is of sufficient width to cover the inner face of the outer casing 20 or so much thereof as may be necessary to guard the inner tube. This sheet 11 has along its opposite edges integral attaching flaps 12 and 13 which are preferably shaved down thinner than the protective body of the sheet.

Another sheet 14 of rawhide or similar material is cut to the proper length and of a width sufficient to cover the inner tube 30 or so much thereof as may be necessary to guard against puncture, preferably all the portion which is outside the circumference of the flanges 41 and 42 of the rim 40. The wider sheet having the attaching flaps is designed preferably to lie against the inner face of the casing 20 and the narrower sheet 14 is designed preferably to lie against the outer face of the inner tube 30.

After the rawhide sheets are thus prepared, one of them, preferably the sheet 11, is laid flat and a layer 16 of strands of asbestos is disposed thereon; then another layer 17 of strands of asbestos is laid over the layer 16 crosswise thereof as shown in Fig. 3. Then powder or dust of aluminum is placed or sifted over said asbestos layers until a layer 18 of such aluminum is formed on top of the asbestos as indicated in Fig. 4. This layer of aluminum may be of a thickness of a sixty-fourth of an inch, more or less. Then a thin sheet 19 of Pará rubber, caoutchouc or other suitable india rubber, of a thickness of say a thirty-second of an inch, more or less, according to the tire with which the protector is to be used, is placed over the layer of aluminum. Then the rawhide sheet 14 is placed over the layer of Pará rubber. Then the layers of material thus assembled are placed in a vulcanizing mold and subjected to the process of vulcanization. This may be effected under a temperature of 376 F., more or less, and under a pressure of sixty thousand pounds to the square inch, more or less. The vulcanization process requires from three to seven hours, more or less, according to the thickness of the material used.

The vulcanization combines together into one composite layer 15 the various layers of asbestos, aluminum and Pará rubber and unites therewith the outer rawhide sheets 11 and 14.

In the application of the invention to a pneumatic tire such as that shown in the drawings or its equivalent, the vulcanized flexible inner lining 10 is placed within the outer casing 20 and its attaching flaps 12 and 13 hang outside the circumferential open slot of said casing. Then the inner tube 30 in collapsed condition is passed through said slot between said flaps into said casing. Then the tire is placed on the wheel rim 40 in the usual manner, care being taken that the flaps 12 and 13 are disposed between the attaching ribs 21 and 22 of the casing 20 and the face of the rim 40, and when the casing has beads as 23 and 24, the flaps 12 and 13 extend between them and the flanges 41 and 42 of said rim. When the inner tube 30 is charged with air the lining 10 is firmly clamped by its attaching flaps 12 and 13 between the outer casing 20 and the wheel rim 40 and the outer face of said inner tube lies against the inner lining 10.

In the use of this invention the inner lining 10 has sufficient resistance to the usual puncturing devices encountered along the road to prevent the penetration of the inner tube 30 and sufficient flexibility to permit it to yield with the usual yielding of the pneumatic tire to the inequalities of the roadbed. In case a nail or other device liable to cause a puncture, projects through the outer casing into contact with the lining 10, the structure of the lining is such that the nail cannot penetrate it. The nail pushes said lining inward for a small area surrounding the point of contact together with the inner tube, forming an inward bulge therein without puncturing said tube. When the nail is pulled away from the outer casing the inner tube will resume its normal shape unimpaired.

I claim as my invention:

1. A non-puncturable inner lining for automobile tires comprising two sheets of rawhide and an intermediate composite layer comprising asbestos, powdered aluminum and soft rubber, all compressed and vulcanized together.

2. In a pneumatic tire the combination of a tire casing, an inflating tube disposed therein, and a non-puncturable lining disposed between said tube and casing and comprising layers of rawhide and an intermediate composite layer of asbestos, aluminum and soft rubber all vulcanized together.

CHARLES SIMEON GOODFELLOW.

Witnesses:
JARVIS N. ATKINSON,
WILLIAM A. GAYNOR.